July 15, 1958 W. F. STEAGALL 2,843,317
PARALLEL ADDERS FOR BINARY NUMBERS
Filed Oct. 27, 1954 4 Sheets-Sheet 1
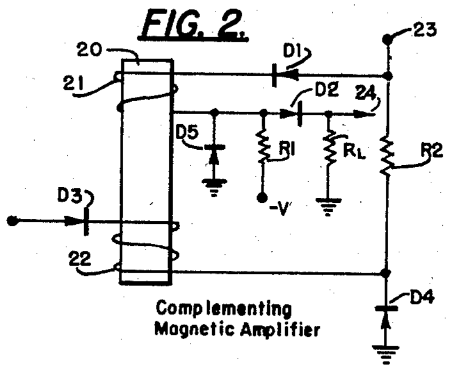
FIG. 3.
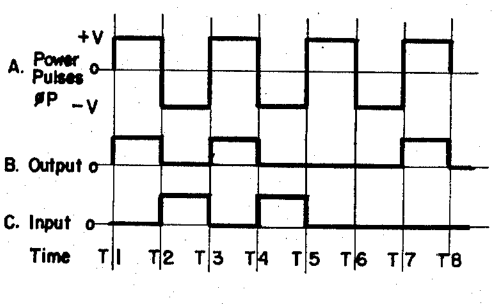
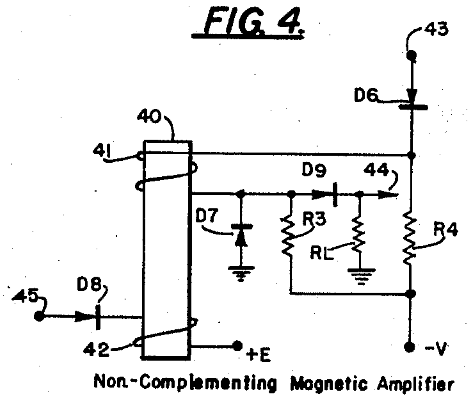
FIG. 5.
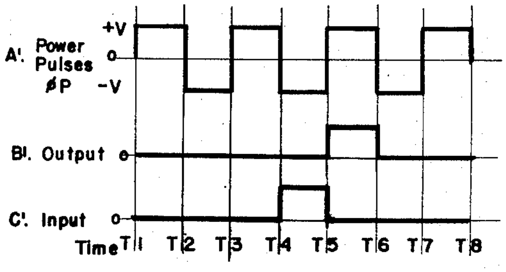
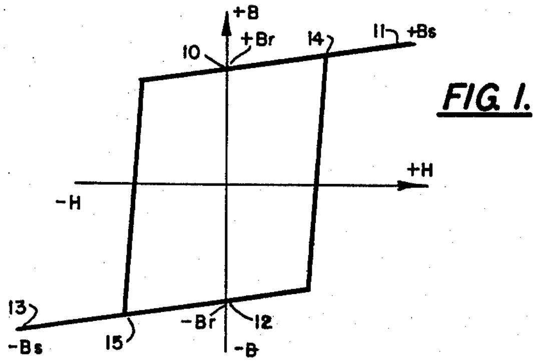
FIG. 1.
INVENTOR
WILLIAM F. STEAGALL
BY E. Jerry Light
ATTORNEY INVENTOR
WILLIAM F. STEAGALL
BY *[signature]*
ATTORNEY

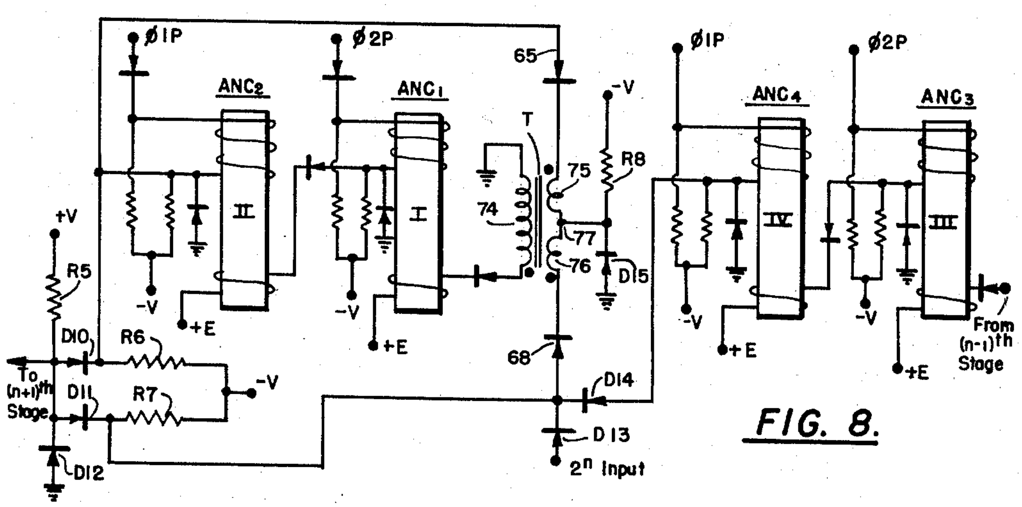
FIG. 8.
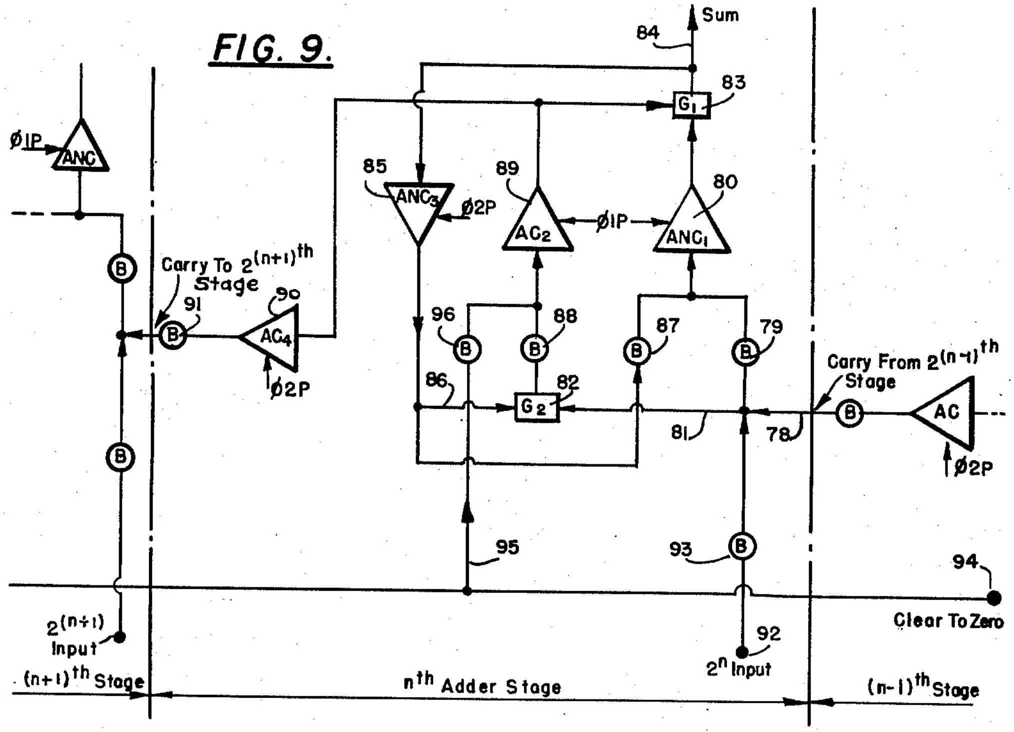
FIG. 9.
ADDITIONAL LEGEND
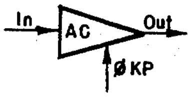
≡ Complementing Magnetic Amplifier Energized By Power Pulses Of Phase K
INVENTOR
WILLIAM F. STEAGALL
BY [signature]
ATTORNEY

PARALLEL ADDERS FOR BINARY NUMBERS

Filed Oct. 27, 1954 4 Sheets-Sheet 4

INVENTOR

WILLIAM F. STEAGALL

BY Eserry Light

ATTORNEY 2,843,317

PARALLEL ADDERS FOR BINARY NUMBERS

William F. Steagall, Merchantville, N. J., assignor, by mesne assignments, to Sperry Rand Corporation, New York, N. Y., a corporation of Delaware Application October 27, 1954, Serial No. 465,004

16 Claims. (Cl. 235—61)

The present invention relates to computing apparatuses and is more particularly concerned with devices capable of performing full parallel addition in binary digital applications. In particular the present invention is primarily concerned with the provision of parallel adders which utilize magnetic amplifiers, preferably of the pulse type.

The process known as binary addition, and in particular parallel addition of binary numbers, is well known in the computing art and units capable of performing such parallel binary addition ordinarily comprise a basic portion of more complex computation devices. In the past, parallel adders for binary numbers have employed vacuum tube circuitry for the most part and have accordingly been subject to the disadvantages that they are relatively fragile in configuration and are subject to operating failures. The present invention serves to obviate the foregoing difficulties and, in essence, provides a parallel adder structure capable of performing full addition of binary numbers and utilizing magnetic amplifiers as basic elements thereof.

It is accordingly an object of the present invention to provide improved parallel adders for use in computing applications.

A further object of the present invention resides in the provision of improved parallel adders which are more rugged in construction and which are less subject to operating failures than has been the case heretofore.

Still another object of the present invention resides in the provision of parallel adders for binary digital numbers employing magnetic amplifiers as components thereof.

A still further object of the present invention resides in the provision of parallel adders which can be made in relatively small sizes.

Another object of the present invention resides in the provision of a computation device comprising in combination a plurality of the magnetic amplifiers so interconnected that the mathematical process known as binary addition may be performed electrically.

Still another object of the present invention resides in the provision of a computation device employing magnetic amplifiers, which computation device is capable of receiving in sequence plural trains of parallel binary digits representative of binary digital numbers and adapted to provide an output train of signals characteristic of the sum of the said parallel input trains.

In providing for the foregoing objects and advantages, the present invention utilizes a plurality of magnetic amplifiers interconnected to form a bistable device, and the said bistable device in turn cooperates with gate means thereby to provide a single stage of the parallel adder. Plural stages of this type may be interconnected in accordance with the invention and each of the said stages serves to receive one binary digit of a parallel input train. The adder so formed operates at each of its stages to provide a sum output representative of the electrical summation of the input binary digits and the carry pulses from a preceding adder stage; each stage further provides carry pulses to the next succeeding adder stage whereby full parallel addition may be readily performed. As will become apparent from the following description, the parallel adder of the present invention operates in accordance with the principles of binary addition.

Before proceeding with a detailed description of my invention, several definitions of the subject matter to be discussed are advisable. In the practice of my invention I utilize both complementing and non-complementing magnetic amplifiers. A complementing magnetic amplifier is, by definition, one which will give an output when no input is presented thereto, or on the contrary, one which gives no output when there is in fact an input. Again, by definition, a non-complementing amplifier is one which will give an output only when an input is presented thereto. The several amplifiers comprising the bistable devices of my invention are energized by "power pulses." These pulses are preferably in the form of regularly occurring positive and negative going square waves. In the precise disposition of components, some amplifiers will be fed by "phase 1 power pulses" and this term merely refers to such positive and negative going square waves timed with respect to an arbitrary datum. Other of the amplifiers will utilize "phase 2 power pulses" and it is to be understood that this latter term again refers to pulses of the same form as phase 1 power pulses timed again with respect to the same arbitrary datum, but so displaced with respect to said datum that a positive going portion of a phase 1 power pulse will coincide with a negative going portion of a phase 2 power pulse and vice versa. Again, it will become apparent from the following description that the several power pulses cooperate with input pulses to selectively produce or inhibit an output from the magnetic amplifier concerned. These input pulses usually, but not necessarily, occur during a negative going portion of the corresponding power pulse applied to the said amplifier, and in this respect therefore when I speak of a "phase 1 input pulse" it is to be understood that this term refers to an input pulse capable of cooperating with a phase 1 power pulse. Similarly, a "phase 2 input pulse" is one which is capable of cooperating with a phase 2 power pulse. A phase 1 input pulse cannot effectively cooperate with a phase 2 power pulse, nor can a phase 2 input pulse effectively cooperate with a phase 1 power pulse.

The foregoing objects, advantages and operation of my invention will become more readily apparent from the following description and accompanying drawings, in which:

Figure 1 is an idealized hysteresis loop of a magnetic material which may preferably be employed in the cores of the magnetic amplifiers utilized in my invention.

Figure 2 is a schematic representation of a simple complementing amplifier of the magnetic type.

Figure 3 (A, B and C) are waveforms illustrating the operation of the complementing magnetic amplifier shown in Figure 2.

Figure 4 is a schematic representation of a simple non-complementing amplifier of the magnetic type.

Figure 5 (A, B and C) are waveforms illustrating the operation of the non-complementing magnetic amplifier shown in Figure 4.

Figure 8 is a schematic diagram illustrative of one possible circuit in accordance with the logic of Figure 6.

Figure 9 is a logical diagram of a parallel adder for binary numbers in accordance with a further embodiment of the present invention.

Figure 6:
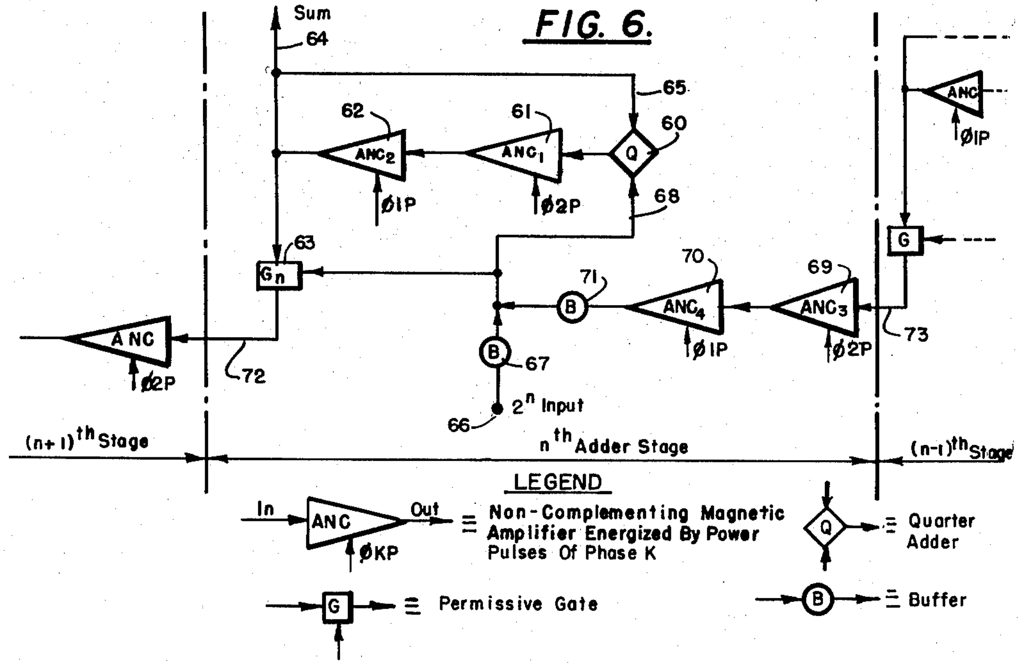
Figure 6 is a logical diagram of one form of parallel adder for binary numbers in accordance with the present invention and includes a legend descriptive of the symbols used therein.

Referring now to Figure 1, it will be seen that the magnetic amplifiers of my invention may preferably, but not necessarily, utilize magnetic cores exhibiting a substantially rectangular hysteresis loop. Such cores may be made of a variety of materials, among which are various types of ferrites and various kinds of magnetic tapes including Orthonik and 4–79 Moly-Permalloy. These materials may be given different heat treatments to effect different desired properties. In addition to the wide variety of materials applicable, the cores of the magnetic amplifiers to be discussed may be constructed in a number of different geometries including both closed and open paths. For example, cup-shaped cores, strips of material, or toroidal cores are possible. It must be emphasized that the present invention is not limited to any specific geometries of its cores, nor to any specific materials therefor; and the examples to be given are illustrative only.

In the following description, bar type cores have been utilized for ease of representation and for facility in showing winding directions. The bar type cores shown may in fact be considered to represent the end view of a toroidal core. Further, the following description refers to the use of materials having substantially rectangular hysteresis loops; this is again for ease of discussion. However, neither the precise core configuration nor the precise hysteretic character of core material is mandatory; and many variations will readily suggest themselves to those skilled in the art.

Returning now to the hysteresis loop shown in Figure 1, it will be noted the the curve exhibits several significant point of operation, namely, point 10 (+B*r*) which represents a point of plus remanence; the point 11 (+B*s*) which represents plus saturation; the point 12 (—B*r*) which represents minus remanence; the point 13 (—B*s*) which represents minus saturation; the point 14 which represents the beginning of the plus saturation region; and the point 15 which represents the beginning of the minus saturation region. Discussing for the moment the operation of the device utilizing a core which exhibits a hysteresis loop such as is shown in Figure 1, let us assume that a coil is wound on the said core. If we should initially assume that the core is at an operating point 10 (plus remanence), and if a voltage pulse is applied to the coil which produces in the said coil a current creating a magnetomotive force in a direction tending to increase the flux in the said core (i. e. in a direction of +H), the core will tend to be driven from point 10 (+B*r*) to point 11 (+B*s*). During this state of operation there is relatively little flux change through the said coil and the coil therefore presents a relatively low impedance whereby energy fed to the said coil during this state of operation will pass readily therethrough and may be utilized to effect a usable output.

On the other hand, if the core should initially be at point 12 (—B*r*) prior to the application of the said +H pulse, upon application of such a pulse the core will tend to be driven from the said point 12 (—B*r*) to the region of plus saturation. The pulse magnitude should preferably be so selected that the core is driven only to the beginning of the plus saturation region, point 14. During this particular state of operation there is a very large flux change through the said coil and the coil therefore exhibits a relatively high impedance to the applied pulse. As a result, substantially all the energy applied to the coil, when the core is initially at —B*r*, will be expended in "flipping" the core from point 12 to the region of plus saturation (preferably to point 14), and thence to point

10, with very little of this energy actually passing through the said coil to give a usable output. Thus, depending upon whether the core is initially at point 10 (+B*r*), or at point 12 (—B*r*), an applied pulse in the +H direction will be presented respectively with either a low impedance or a high impedance and will effect either a relatively large output or a relatively small output. These considerations are of great value in the construction of the magnetic amplifiers utilized in the present invention, such as are shown in Figures 2 and 4.

Referring now to Figures 2 and 3, it will be seen that a complementing magnetic amplifier, provided in accordance with the present invention, comprises a core 20 preferably but not necessarily exhibiting a hysteresis loop similar to that discussed in reference to Figure 1. The core 20 bears two windings thereon, namely, a winding 21 which is termed the power or output winding, and a signal or input winding 22. One end of the power winding 21 is coupled to a diode D1 poled as shown and the diode D1 is in turn connected to an input terminal 23 supplied with a train of positive and negative going power pulses such as is shown in Figure 3A. The power pulses shown preferably, but not necessarily, have a center value of "0" volts and exhibit excursions between plus and minus V volts. Assuming now that the core is initially at plus remanence (point 10 of Figure 1), a positive going power pulse applied at terminal 23 during the time *t*1 to *t*2 will cause current to pass through the diode D1, through the relatively low impedance exhibited by power winding 21 and thence through diode D2 and load resistor RL to ground. Because of the low impedance exhibited by coil 21, a substantial output pulse will therefore appear at the terminal 24 during the time *t*1 to *t*2. At time *t*2, and in the absence of any signal input, the core will return to the operating point 10 (shown in Figure 1) and the next positive going power pulse applied during the time *t*3 to *t*4, for instance, will again drive the core to pulse saturation, again giving an output during this time *t*3 to *t*4. Thus, in the absence of any other inputs, if the core 20 should initially be at plus remanence, successive positive going power pulses will cause successive outputs to appear at output terminal 24.

Let us now assume, however, that an input pulse is applied during the time *t4* to *t5*, such as is shown in Figure 3C. This input pulse causes current to pass through the diode D3 and through coil 22 and (as will be noted from Figure 2, inasmuch as the said coil 22 is wound in a direction opposite to that of coil 21, the said input pulse will effect a —H magnetizing force on the core 20. Thus, during the the time *t4* to *t5*, the application of an input pulse as described will cause the core 20 to be flipped in a counter-clockwise direction from the plus remanence point to the region of the minus remanence point (point 10, to point 15, to point 12 of Figure 1) and at time *t5* the core 20 will find itself at the operating point 12, —B*r*, preparatory to the reception of the next positive going power pulse applied during the time *t5* to *t6*. This next positive going power pulse will thus find the coil 21 to present a relatively high impedance and, as a result, substantially all of the energy presented by the power pulse will be expended in flipping the core back to the region of point 10 (+B*r*), via point 14, rather than in producing a usable output. Thus, as will be seen from an examination of Figure 3, the application of an input pulse during the occurrence of a negative going portion of the applied power pulses will effectively prevent the output of a usable pulse during the next succeeding positive going power pulse. The system thus acts as a complementer.

While the foregoing discussion has described in essence the operation of a complementing magnetic amplifier in accordance with the present invention, several further design considerations should be noted. First of all, even though, during the time *t5* to *t6* for instance, the energy in the positive going power pulse is expended in merely flipping the core from $-Br$ to $+Br$, a small output termed a sneak output may still appear across RL. Such sneak outputs are effectively suppressed by the combination of resistor R1 and diode D5 connected as shown in Figure 2. This suppression is effected by so choosing the magnitude of resistor R1 that a current flows from ground through the said diode D5 and resistor R1 to a source of negative potential —V, which current is equal to or greater than the magnitude of the sneak pulse current to be suppressed. Because of the operation of diode D5 and resistor R1, therefore, only outputs larger than that of the sneak output may appear at output 24.

Again, the passage of energy through power winding 21 due to the application of a positive going power pulse at the terminal 23, will cause a flux change to occur in the coil 21 as described, and this flux change will in turn tend to induce a voltage in the signal coil 22. This induced voltage is negative at the cathode of D3 and positive at the cathode of D4, and although the induced voltage is small if the core is at point 10 ($+Br$) when the positive going power pulse is applied, it is nevertheless necessary to prevent current from flowing in the signal winding 22 due to this small induced voltage. The combination of resistor R2 and diode D4 accomplishes this function by allowing the lower end of signal winding 22, connected to the junction of the said resistor R2 and diode D4, to attain the power pulse potential when the power pulse is positive. Since the base level of an input pulse, as applied through diode D3, is "0" volt, no current can now flow due to the small induced voltage discussed previously. Further, if the core 20 should initially be at $-Br$, upon application of a positive going power pulse a relatively large flux change occurs in the core and a relatively large voltage will be induced in the lower winding 22. The blocking action of the R2—D4 circuit still prevents current from flowing in the said lower winding 22 if there are fewer turns on signal winding 22 than are on power winding 21. It is well known in the art that this relationship between the number of turns on the windings must exist if a voltage gain is to be produced by the amplifier.

Finally, it should be noted that when a power pulse, such as is shown in Figure 3A, is negative going, only a negligible current can flow in diode D1. In this respect it has been assumed that the back resistance of the several diodes shown is infinite and that the forward resistance is zero. While this is not strictly true, these assumptions are convenient and do not substantially affect the explanation. Even though no current flows through the diode D1 during the application of a negative going portion of the power pulse, current flows in the R2—D4 circuit, the magnitude of this current being approximately $$\frac{V}{R2}$$

This current serves to hold the end of signal winding 22 connected to the junction of resistor R2 and diode D4 at approximately ground potential, and as a result, signal inputs applied through the diode D3 during a negative going power pulse portion pass through the said diode D3, through winding 22, as previously discussed, to the junction of resistor R2 and diode D4, which junction is approximately at ground potential. It should further be noted that the current which flows as a result of an input pulse through diode D3 must produce sufficient magnetizing force to flip core 20 from plus remanence to minus remanence during the input pulse period. This value of current must not exceed the magnitude $$\frac{V}{R2}$$

but this condition is easily aranged by proper choice of resistor R2.

Summarizing the foregoing briefly, it will be seen that the circuitry of Figure 2 provides a complementing magnetic amplifier wherein outputs will appear from the said amplifier so long as no input signal is presented thereto during negative going portions of the power pulses applied. Such a complementing magnetic amplifier may be utilized as a portion of the adder devices in accordance with the several embodiments of the present invention. Before proceeding with the description of these adder devices, however, let us examine the construction and operation of a non-complementing magnetic amplifier such as may also be utilized in the present invention.

Referring to the circuit shown in Figure 4, and making reference to the waveform diagrams of Figure 5 (A through C), it will be seen that a non-complementing amplifier in accordance with the present invention utilizes a magnetic core 40, again preferably but not necessarily exhibiting a hysteresis loop substantially the same as that shown in Figure 1. The core 40 again carries two windings thereon, namely, a power or output winding 41 and a signal or input winding 42. One end of the power winding 41 is coupled through a diode D6, poled as shown, to a source of positive and negative going power pulses such as is shown in Figure 5A. For the purposes of the following discussion, the power pulses are again assumed to have a center value of "0" volt and to exhibit excursions between plus and minus V volts. Assuming now that the core 40 is initially at $-Br$, point 12 of Figure 1, application of a positive going power pulse during the time $t1$ to $t2$, at power input terminal 43, will cause a current to flow through the diode D6 to winding 41 and thence through diode D9 and resistor RL, to ground. Inasmuch as this energy is for the most part expended in flipping the core from $-Br$ (point 12 of Figure 1) to $+Br$ (point 10 of Figure 1), only a sneak output at best will appear across the load resistor RL, and this sneak output is again effectively suppressed by the combination of resistor R3 and diode D7, as was discussed in reference to Figure 2. Thus, during the time $t1$ to $t2$ the applied positive going power pulse merely succeeds in flipping the core from $-Br$ to $+Br$, and due to the sneak suppression by diode D7 and resistor R3, no output will appear at terminal 44. During the period $t2$ to $t3$, a negative going power pulse is applied to terminal 43 and this applied pulse effectively causes diode D6 to cut off. During this period of time, a reverse current flows through the power winding 41 from ground through diode D7, through the said winding 41 and thence through resistor R4 to the source of negative potential —V. The value of this current is substantially $$\frac{V}{R4}$$

and R4 is so chosen that the current flow in the reverse direction through coil 41 is sufficient to flip the core during the time period $t2$ to $t3$ from $+Br$ back to $-Br$ in a counter-clockwise direction. Thus, at time $t3$, the core once more finds itself at the $-Br$ operating point and a further positive going power pulse applied at terminal 43 during the time $t3$ to $t4$ will again merely flip the core to the $+Br$ point without effecting an output. Thus, in the absence of any other input signals the core is regularly flipped between $-Br$ and $+Br$ and back to $-Br$ without there being any output.

If we should now assume that an input pulse, as shown in Figure 5C, should be applied to input terminal 45 during the time period $t4$ to $t5$, this input pulse will cause current to flow through the winding 42 via diode D8 and will subject the core 40 to a supplemental magnetizing force. As will become apparent from an examination of the winding directions shown in Figure 4, the magnetizing force effected by coil 42 during the time $t4$ to $t5$ is in a direction opposite to that effected by the reverse current flow through coil 41 during this same time period. The magnetizing effect of the said reverse current flow through winding 41 is thereby effectively nullified and therefore at the end of the $t4$ to $t5$ time period the core remains at the operating point $+Br$. Application of a further positive going power pulse during the time $t5$ to $t6$ will therefore cause a substantial output to appear across load resistor RL, and at output terminal 44. If no further input pulse should be applied during the time $t6$ to $t7$ the reverse current flow through winding 41 will again cause the core to flip back to the $-Br$ point, no output will appear during the time $t7$ to $t8$, etc. Thus, the arrangement shown in Figure 4 permits an output to appear across resistor RL during the application of a positive going power pulse only if an input were applied at the terminal 45 during the next preceding negative going power pulse.

One other design consideration should be noted. Current flow through the windings 41 will, in the absence of other circumstances, establish flux changes tending to induce a voltage in the signal input coil 42. In order to protect the input circuit connected to diode D8 against any interference from current flowing in the power winding 41, the signal winding 42 is returned to a positive voltage, $+E$, as shown, which positive voltage is equal and opposite in value to the voltage induced or generated in it by current flowing in the power winding 41 when reverse current flows through the said winding 41.

Referring now to Figure 6, one form of parallel adder in accordance with the present invention has been illustrated and it will be seen that each stage of the particular parallel adder shown therein comprises plural magnetic amplifiers operating in accordance with the preceding discussion. For convenience, only one stage of the adder, together with the necessary connections to the preceding and succeeding stages, has been shown. The complete stage is shown between the broken vertical lines, and is termed the "$n$th" stage to indicate that the binary digits of significance $2^n$, where $n$ is any integer, are applied thereto. The particular embodiment of my invention shown utilizes a binary counter comprising a quarter adder 60, the output of which is coupled to a first non-complementing magnetic amplifier 61. The definition of a "quarter adder," and one possible construction for quarter adder 60, are given subsequently. The output of amplifier 61 is in turn coupled to the input of a further non-complementing amplifier 62, the output of which is fed to one input of a gate 63 designated $G_n$, as well as being fed to a sum output terminal 64 and to an input 65 of the quarter adder 60. A terminal 66 is provided, to which terminal one binary digit of a parallel input may be selectively applied, and the signal appearing at the said terminal 66 which has been termed a $2^n$th input, is selectively fed via a buffer 67 to a further input 68 of the quarter adder 60 as well as to a second input of the gate 63.

If any carry signal should be produced by a preceding adder stage of the parallel adder in accordance with the present invention, this carry signal is fed from the $(n-1)$th adder stage to the $n$th added stage shown in Figure 6, and this carry signal is coupled to the input of a non-complementing amplifier 69 and thence to the input of a further non-complementing amplifier 70. The output of amplifier 70 is further coupled via a buffer 71 to the input 68 of the quarter added 60 as well as to the second input of the gate Gn; and the output of the said gate Gn appears at a terminal 72 and is representative of a carry from the $n$th adder stage to the $(n+1)$th stage. The portion of the circuit comprising the quarter adder 60 and the two non-complementing amplifiers 61 and 62 act as a binary counter in that a first input on the line 68 coupled to the quarter adder 60 will cause a first stable output state to be achieved which first stable output state is represented by a plurality of sequentially appearing pulses at the output terminal 64. A second input pulse on the terminal 68 of the quarter adder 60 will cause the binary counter to assume a second stable state represented by no output signals at the output terminal 64. The two states are termed the "one" and "zero" states, respectively. The gate 63 provides a carry output from the $n$th adder stage at the transition of the binary counter, discussed previously, from its "one" to its "zero" state. The two further magnetic amplifiers 69 and 70 together provide power gain and proper timing from the output of the carry gate of the $(n-1)$th stage to the quarter adder input of the $n$th stage. As shown, the parallel adder requires $(n+1)$ power pulse cycles to add together two $n$-digit binary numbers.

Before proceeding with a detailed description of the particular logical diagram illustrated, it should be noted that the operation will be unaffected if, for instance, both of the amplifiers 61 and 62 in fact comprise complementing magnetic amplifiers rather than the non-complementing magnetic amplifiers shown. Similarly, the amplifiers 69 and 70 may be replaced by complementing magnetic amplifiers and in fact all of the four magnetic amplifiers shown in Figure 6 may take the form of complementing magnetic amplifiers rather than non-complementing amplifiers without affecting the operation of the adder stage illustrated.

Figure 7:
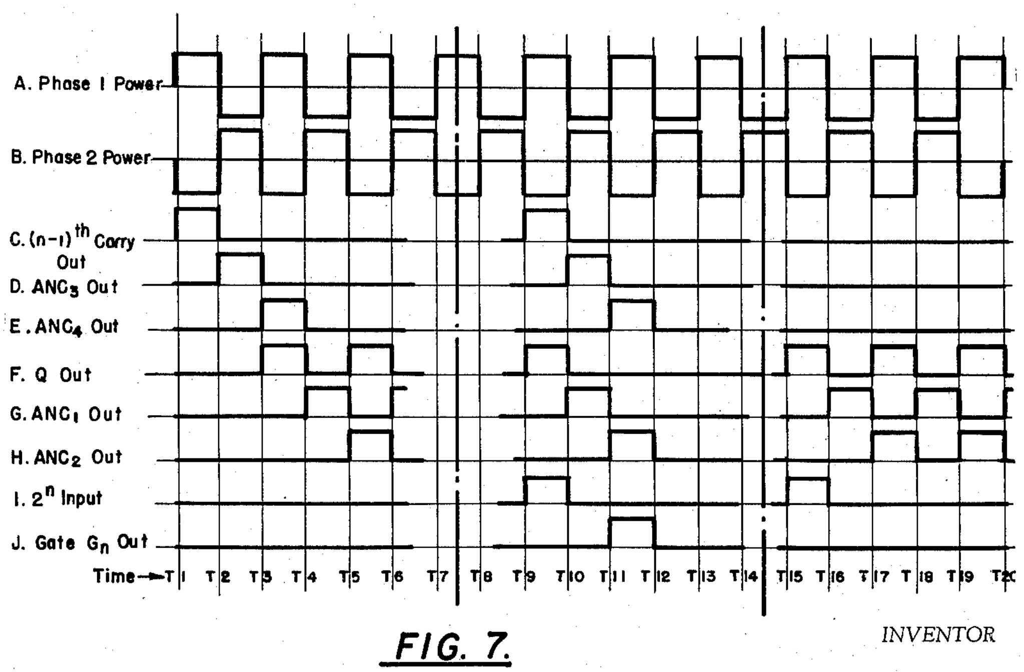
Figure 7 (A through J inclusive) are waveforms illustrating the operation of the parallel adder shown in Figure 6.

Referring now to Figure 7, the operation of the device shown in Figure 6 will become readily apparent and in this respect the discussion will be confined to the operation of one stage only, designated the $n$th adder stage, it being realized that as many such stages will ordinarily be provided as are required to accept the bits representative of a parallel binary input. The amplifiers 62 and 70 are each energized from a source of phase 1 power pulses such as have been shown in Figure 7A. Again, the amplifiers 61 and 69 are energized from a source of phase 2 power pulses such as have been shown in Figure 7B. If we should now assume that a carry output appears from the $(n-1)$th stage during a time interval $t1$ to $t2$, this carry input appears on a line 73 and is fed to the input of amplifier 69. The non-complementing magnetic amplifier 69 thus produces an output pulse during the time interval $t2$ to $t3$ which pulse is fed to the input of the further amplifier 70 causing the amplifier 70 to produce a still further output pulse during the time interval $t3$ to $t4$. The output pulse so produced is coupled via the buffer 71 to the input terminal 68 of the quarter adder 60. Quarter adders are, by definition, devices wherein the presence of one or the other, but not both, of two input signals effects an output signal; while simultaneity of either the presence or absence of the said two input signals results in there being no output signal. Quarter adder 60 may be of any configuration known in the prior art and the operation of the said quarter adder 60 is such, in accordance with the preceding definition, that it produces an output when a single input only appears at one of its input terminals 65 or 68. The quarter adder produces no output, on the other hand, when simultaneous pulses are applied to the input terminals 65 and 68, or when no pulses are applied to either of the said input terminals. Such devices are in general well known in the prior art, and one possible configuration is shown in Figure 8 and will be discussed in reference to that figure.

Returning now to the showing of Figure 7, it will be seen that the coupling of an input to the terminal 68 of quarter adder 60 during the time interval $t3$ to $t4$ will produce an output pulse from the said quarter adder 60 (there being no input during this time interval on the terminal 65) and the output from quarter adder 60 will in turn cause the non-complementing magnetic amplifier 61 to produce an output pulse during the time interval $t4$ to $t5$ (Figure 7G). The output of amplifier 61 causes amplifier 62 to effect a further output pulse during the time interval $t5$ to $t6$ and this further output pulse is coupled via the terminal 65 to the quarter adder 60 causing the said quarter adder 60 to also produce an output pulse during the time $t5$ to $t6$. The output pulse from quarter adder 60 once more causes amplifier 61 to produce a still further output pulse whereby the sequence of operation is repeated. Thus, the input to the $n$th adder stage from the carry gate of the $(n-1)$th stage has caused the binary counter comprising amplifiers 61 and 62 and quarter adder 60 to assume a first stable output state represented by a plurality of regularly occurring pulses appearing, for instance, at the sum terminal 64. Inasmuch as no simultaneous signals are applied to the gate 63 ($G_n$) during any of the preceding operation, no output pulse appears at the carry output 72. The sequence of operations thus described and illustrated in Figure 7 for the time intervals $t1$ through $t6$ depict the state of operation of the $n$th adder stage shown for a carry input via the line 73 without a corresponding bit input at the terminal 66; and this operation is in conformance with the binary summation that 1+0 gives a sum of 1 and a carry of 0.

Operation of the circuit shown in Figure 6 for a different input state may be seen from an examination of Figure 7 for the time intervals $t9$ through $t14$, for instance. Thus if we should assume once more that a carry input appears on the line 73 from the $(n-1)$th adder stage during the time interval $t9$ to $t10$, this carry input will once more cause amplifier 69 to produce an output pulse during the time interval $t10$ to $t11$ and the amplifier 70 to produce an output pulse during the time interval $t11$ to $t12$. If a binary digital signal should also be coupled to the $2^n$ input terminal 66 during the time interval $t9$ to $t10$, this bit will be coupled via the buffer 67 to the input terminal 68 of the quarter adder 60 and the said quarter adder 60 will in turn produce an output pulse during the time interval $t9$ to $t10$ (Figure 7F). The output from quarter adder 60 will therefore effect an output pulse from amplifier 61 during the time interval $t10$ to $t11$ whereby a still further output pulse will be effected by the amplifier 62 during the time interval $t11$ to $t12$. As will be seen from an examination of Figure 7, during the time interval $t11$ to $t12$, therefore, inputs to the quarter adder 60 will appear at each of the quarter adder terminals 65 and 68, one of the said inputs being from the output of amplifier 70 while the other of said inputs is from the output of amplifier 62. Quarter adder 60 will therefore produce no output during the time interval $t11$ to $t12$ whereby the binary counter is caused to assume a stable state represented by no output pulses at the sum terminal 64. By the same token, however, during the time interval $t11$ to $t12$ two inputs are coupled to the gate 63, again from the outputs of amplifiers 62 and 70 respectively; and therefore the gate 63 will provide an output pulse on its output terminal 72 during the time interval $t11$ to $t12$ (Figure 7J). Summarizing, therefore, the application of both a carry and a $2^n$ input to the $n$th adder stage results in a zero output state at the sum output terminal 64; and a "one" pulse output from the carry gate $G_n$ to the $(n+1)$th stage of the adder. Again, therefore, the adder configuration has acted in accordance with accepted binary addition principles.

Finally, referring to waveforms shown in Figure 7 for the time intervals $t15$ to $t20$, the operation of the device when a $2^n$th input is applied without a corresponding carry input from the $(n-1)$th stage will be seen. Thus, during the time interval $t15$ to $t16$, if a $2^n$ input should appear at the input terminal 66, the pulse will be coupled via the buffer 67 to the input of the quarter adder 60 causing the said quarter adder to produce an output pulse during the time interval $t15$ to $t16$. This output pulse will in turn effect an output from amplifier 61 during the interval $t16$ to $t17$, whereby a still further output will be effected from the amplifier 62 during the time interval $t17$ to $t18$. The output of amplifier 62 is coupled via the input terminal 65 to quarter adder 60 and, as a result, the quarter adder will produce a still further output pulse during the time interval $t17$ to $t18$. Thus, the binary counter portion of my quarter adder has assumed its "one" output stable state; inasmuch as no simultaneous pulses are applied at any time to the input of the carry gate 63, no output appears on the line 72. Once more, therefore, the device acts in accordance with the principles of binary addition. Clearly, if no inputs are coupled via line 73 or via terminal 66 there will be no output pulses on the sum output terminal 64, nor will there be any carry output on the line 72. The adder stage of Figure 6 therefore operates in the manner desired for all possible input states.

Referring to Figure 8, one possible schematic representation in accordance with the logic of Figure 6 may be seen. The magnetic amplifiers having the cores I, II, III and IV correspond respectively to non-complementing amplifiers 61, 62, 69 and 70 of Figure 6. Each of the amplifier configurations shown in Figure 8 are equivalent to the magnetic amplifier discussed in reference to Figure 4 and operate in accordance with that discussion. The gate 63 ($G_n$) corresponds to the configuration comprising resistors R5, R6 and R7 in conjunction with the diodes D10, D11 and clamping diode D12. Diodes D13 and D14 correspond respectively to buffers 67 and 71.

Quarter adder 60 of Figure 6 may take a number of different configurations including devices employing both pulse type and carrier type magnetic amplifiers, as well as further devices employing pulse transformers, for instance. One such quarter adder in accordance with the transformer type is shown in Figure 8 and such a quarter adder may comprise a pulse transformer T having a secondary winding 74 and two primary windings 75 and 76. The primary windings are in turn connected together at terminal 77 and a diode D15 is coupled between the terminal 77 and ground. In addition, a resistor R8 is coupled between the said terminal 77 and a source of negative potential $-V$. The upper end of primary winding 75 is coupled to the cathode of a diode, the anode of which corresponds to input terminal 65 of Figure 6, while the lower end of primary winding 76 is coupled to the cathode of a diode, the anode of which corresponds to input terminal 68. The two primary windings 75 and 76 are wound of opposite polarity to one another and the respective polarities of the windings 74, 75 and 76 are as shown in Figure 8.

In practice, and in the absence of any input at either terminal 65 or 68, a current flows from ground through the diode D15 through the resistor R8 to the source of negative potential $-V$, whereby the terminal 77 of the primary windings 75 and 76 is maintained at ground potential. If a pulse should appear at either terminal 65 or at terminal 68, a current will be caused to flow in the corresponding primary winding inducing a potential in the secondary winding 74. If, however, pulses appear simultaneously at both terminals 65 and 68, the upper end of the winding 75 and the lower end of the winding 76 will be raised to the same potential and, in fact, the terminal 77 will be raised above ground potential. As a result, no resultant signal current flows in the windings 75—76 and no potential will be induced in the secondary winding 74. Thus, the presence of one or the other of two inputs produces an output, while the simultaneous presence or absence of the said two inputs will produce no output. The arrangement comprising transformer T and the windings 74, 75 and 76 in conjunction with the diode D15 and the resistor R8 therefore acts as a quarter adder and may be utilized to perform the function of the quarter adder 60 shown in Figure 6.

A modified parallel adder for binary numbers in accordance with the present invention is shown in logical representation in Figure 9. Again, each stage of the adder comprises in essence a binary counter in conjunction with means selectively producing a carry output. The particular arrangement shown in Figure 9 accepts a carry output from an $(n-1)$th stage on a line 78, and this carry is fed via buffer 79 to the input of a non-complementing magnetic amplifier 80 as well as via line 81 to one input of a gate 82. The output of non-complementing magnetic amplifier 80 is fed to one input of a further gate 83, the output of which selectively appears at a sum output terminal 84. The terminal 84 is further coupled to the input of a further non-complementing magnetic amplifier 85, the output of which is coupled via line 86 to the other input of gate 82 as well as via a buffer 87 to the input of the non-complementing magnetic amplifier 80. The output of gate 82 is fed selectively via a buffer 88 to the input of a complementing magnetic amplifier 89, the output of which amplifier is fed both to the second input of the gate 83 and to the input of a still further complementing magnetic amplifier 90. The output of complementing magnetic amplifier 90 is coupled via a buffer 91 and acts as the carry to the $(n+1)$th stage of the adder. The $2^n$th input is selectively fed via a terminal 92 and a buffer 93 to one input of the gate 82 (via line 81) as well as to the input of non-complementing magnetic amplifier 80 (via buffer 79).

In addition, a "clear-to-zero" terminal 94 is provided which terminal is coupled, for instance by a line 95 and a buffer 96, to the input of the complementing magnetic amplifier 89 as well as to the input of the corresponding complementing magnetic amplifier in each of the adder stages. As will become apparent from the consideration of the circuit shown in Figure 9, the application of a clear-to-zero pulse at the terminal 94 will be coupled via line 95 and buffer 96 to the input of complementing magnetic amplifier 89 thereby inhibiting any output from the said amplifier. This lack of output from complementing amplifier 89 will in turn prevent there being any output on the sum output terminal 84 via the gate 83 whereby, upon application of a pulse at the clear-to-zero terminal 94, each of the sum output terminals 84 of the several adder stages will be caused to assume a zero output state.

Figure 10:
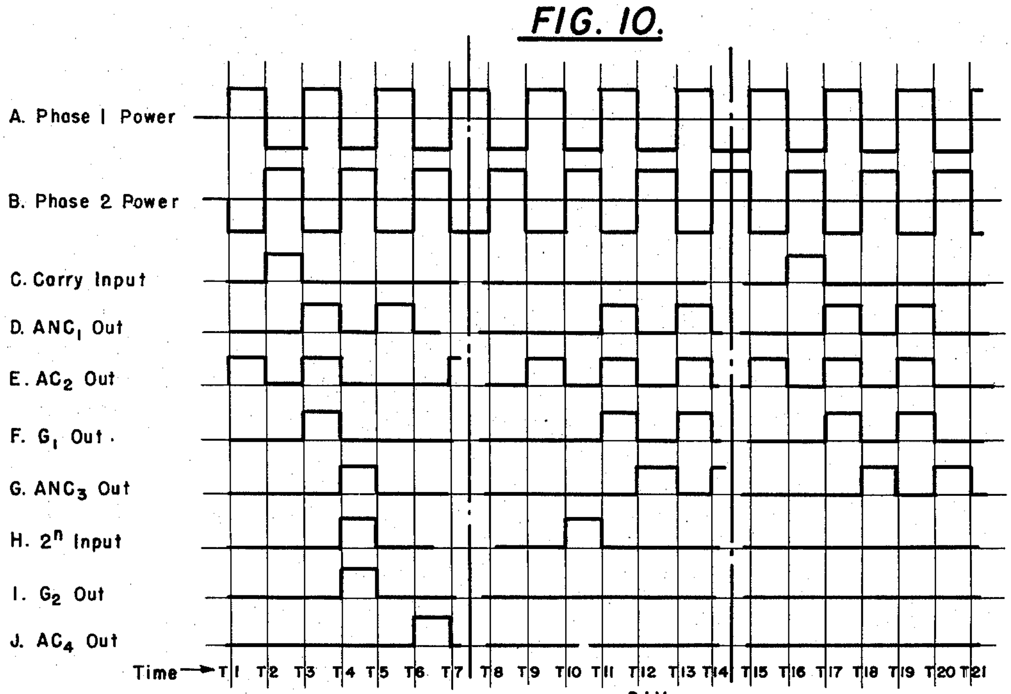
Figure 10 (A through J inclusive) are waveforms illustrating the operation of the parallel adder shown in Figure 9.

Referring now to the waveforms shown in Figure 10, the operation of the circuit of Figure 9 will become apparent. The waveforms occurring during the time intervals *t*1 to *t*7 inclusive correspond to a situation wherein both a carry and a $2^n$th input are coupled to the adder stage; the waveforms for the time intervals *t*9 to *t*14 show the operation of the device when only a $2^n$th input pulse is applied, there being no carry input; and the waveforms for the time intervals *t*16 to *t*21 depict the operation of the device when there is only a carry input without a corresponding $2^n$th input to the $n$th adder stage.

Referring now to the particular waveforms shown, it will be seen that if a carry input should be applied to the $n$th adder stage via the line 78 during a time interval *t*2 to *t*3, this input pulse will be coupled via the buffer 79 to the input of non-complementing amplifier 80 whereby the amplifier 80 will produce an output pulse during the time interval *t*3 to *t*4. This output pulse is coupled to one of the inputs of the gate 83. Since no input has been applied to the complementing amplifier 89 this amplifier will produce output pulses during the time intervals *t*1 to *t*2, *t*3 to *t*4, etc. and as a result, during the time interval *t*3 to *t*4 pulse inputs will appear at each of the input terminals of the gate 83. Thus, during this particular time interval, the gate 83 will pass an output pulse which appears at the sum output terminal 84 (Figure 10F), and this output pulse is further coupled to the input of non-complementing magnetic amplifier 85. Amplifier 85 therefore will produce an output pulse during the time interval *t*4 to *t*5 which output pulse is coupled via line 86 to one input of the gate 82 as well as via the buffer 87 to the input of non-complementing magnetic amplifier 80. The input to amplifier 80 via buffer 87 during the time interval *t*4 to *t*5 causes the said amplifier 80 to produce a still further output pulse during the time interval *t*5 to *t*6.

If we should now assume that a $2^n$th input is coupled via terminal 92 and buffer 93 during the time interval *t*4 to *t*5 (Figure 10H), this $2^n$th input pulse will be coupled via line 81 to an input of the gate 82. The gate 82 will therefore pass an output pulse during the time interval *t*4 to *t*5 (Figure 10I), which output pulse is coupled via the buffer 88 to the input of complementing amplifier 89, inhibiting any output from the said amplifier 89 during the time interval *t*5 to *t*6. This lack of output from amplifier 89 prevents gate 83 from passing a pulse during the time interval *t*5 to *t*6 even though there is output from the amplifier 80 during this time interval, and therefore the adder stage produces no output pulses on sum output terminal 84. This is in fact a stable state inasmuch as the lack of output pulses at terminal 84 will prevent there being any output from non-complementing magnetic amplifier 85, which will in turn prevent there being any output from non-complementing magnetic amplifier 80, etc.

The output pulses appearing from the complementing amplifier 89 during the time intervals *t*1 to *t*2, *t*3 to *t*4, etc. are also coupled to the input of the complementing magnetic amplifier 90 and serve to inhibit any output therefrom. However, the occurrence of an output from the gate 82 during the time interval *t*4 to *t*5 prevents there being any output from amplifier 89 during the time interval *t*5 to *t*6, as has been discussed previously, and therefore complementing magnetic amplifier 90 produces an output pulse during the time interval *t*6 to *t*7 (Figure 10J). Thus, the application of a carry input pulse via the line 78 as well as a $2^n$th input pulse via the terminal 92 has caused the adder stage to assume a zero sum output and, further, has caused the device to effect a carry pulse to the next adder stage. This operational result conforms to the principles of binary addition in that two "one" inputs effect a sum of "zero" and a carry of "one."

The waveforms shown in Figure 10 for the time intervals *t*9 to *t*14 depict still another operating sequence. Once more in the absence of any input pulses, the complementing amplifier 89 produces output pulses during the time intervals *t*9 to *t*10, *t*11 to *t*12, *t*13 to *t*14, etc. If we should now assume that no carry input appears via the line 78 for the particular state of operation to be discussed, but that a $2^n$th input is coupled via the terminal 92 and buffer 93 during the time interval *t*10 to *t*11, this $2^n$th input will be applied via buffer 79 to the input of non-complementing magnetic amplifier 80 and will cause the said amplifier 80 to effect an output during the time interval *t*11 to *t*12 (Figure 10D). Inasmuch as an output pulse from amplifier 89 has been coupled to the gate 83 during this same time interval, the gate 83 will pass an output pulse to the sum output terminal 84 during the time interval *t*11 to *t*12. As before, the output of gate 83 is also coupled to the input of non-complementing magnetic amplifier 85 whereby the said amplifier 85 produces an output pulse during the time interval *t*12 to *t*13 and this output pulse is coupled via a buffer 87 back to the input of non-complementing magnetic amplifier 80. A stable state is thus achieved in which output pulses appear at the sum output terminal 84. The lack of a carry input via the line 78 results, however, in there being no output from the gate 82 during this particular state of operation whereby the complementing magnetic amplifier 89 continues to produce output pulses which not only operate to open the gate 83 but further serve to inhibit any outputs from the complementing amplifier 90. Thus, the device again acts in conformity with the principles of binary addition in that a single "one" input results in a sum output of "one" and a carry output of "zero."

A still further operating sequence is depicted in Figure 10 for the time intervals *t*15 to *t*21. As shown, if a carry input should be coupled from the $(n-1)$th stage via the line 78 during the time interval *t*16 to *t*17, this carry input will cause the non-complementing magnetic amplifier 80 to effect an output pulse during the time interval $t17$ to $t18$. As before, the complementing amplifier 89 also produces an output pulse during the time interval $t17$ to $t18$ whereby the gate 83 is caused to pass an output to the sum output terminal during this time interval $t17$ to $t18$. The output pulse appearing at terminal 84 is once more coupled to the input of amplifier 85 and the output of the said amplifier 85 is passed during the time interval $t18$ to $t19$ to the input of amplifier 80 via buffer 87. Once more a stable state is effected, therefore, in which output pulses appear periodically at the sum output terminal 84. The lack of an input at the $2^n$th input terminal 92, however, again assures that no output is passed by the gate 82 whereby the complementing amplifier 90 is prevented from passing any carry output in accordance with the preceding discussion. Again, therefore the device acts in conformity with the principles of binary addition.

As will become apparent upon an examination of Figure 9, if no input pulse should be coupled via line 78 or via terminal 92, the device will produce a "zero" output at the sum output terminal 84 and there will further be a "zero" carry via the buffer 91 to the $(N+1)$th stage of the adder.

Figure 11:
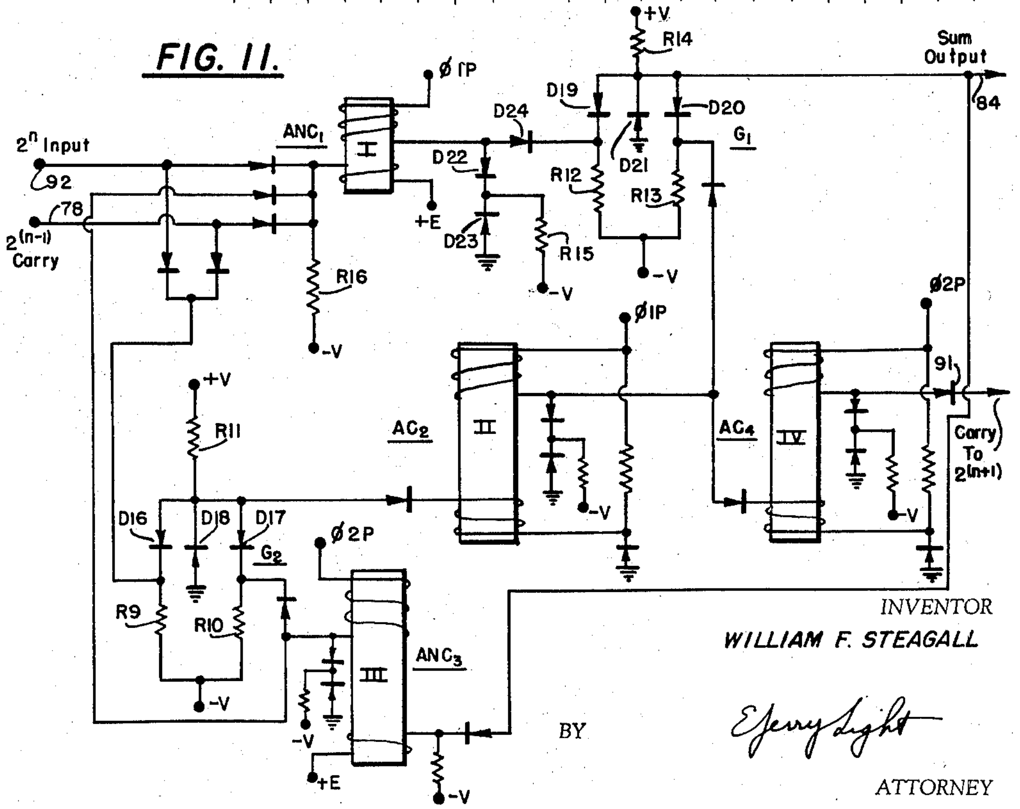
Figure 11 is a schematic representation of one form of parallel adder in accordance with the logic of Figure 9.

One possible circuit in conformity with the logic of Figure 9 is illustrated schematically in Figure 11. The amplifiers having cores I, II, III and IV correspond respectively to the magnetic amplifiers 80, 89, 85 and 90. The gate 82 is provided by the configuration comprising resistors R9, R10 and R11 in conjunction with diodes D16, D17 and clamping diode D18. Again, the gate 83 is provided by the configuration comprising resistors R12, R13 and R14 in conjunction with diodes D19, D20 and clamping diode D21. The several buffers shown in Figure 9 similarly find equivalent diodes in the schematic representation of Figure 11.

It should be noted that the particular amplifiers employed in the arrangement of Figure 11 are slightly different in configuration from those discussed in reference to Figures 2 and 4, and such a different configuration has in fact been employed to illustrate one possible modification in accordance with the present invention. Thus, the several sneak suppressor circuits comprise a pair of diodes having their cathodes coupled together, in conjunction with a resistor connected between the common cathode connection and a source of negative potential —V. Referring, for instance, to the amplifier having magnetic core I, it will be seen that the sneak suppressor coupled to the lower end of the power winding carried by the said core comprises a pair of diodes D22 and D23 connected as shown in conjunction with a resistor R15. In practice, when the power pulse applied to the upper end of the power winding of the magnetic amplifier I is positive going in nature, the diode D22 is rendered conductive whereby the diode D23 and the resistor R15 are effectively connected directly to the lower end of the power winding and act as a sneak suppressor in accordance with the principles discussed previously. When the power pulse applied to the upper end of the power winding becomes negative in potential, however, the diode D22 is rendered non-conductive, as is the coupling diode D24 to the gate G1, whereby no energy may be coupled to the said gate and the sneak suppressor is effectively out of the circuit.

The modified amplifier forms shown in Figure 11 further provide a different current path, in the several non-complementing amplifiers shown, for the passage of reverse current during the application of a negative going power pulse, for flipping the non-complementing magnetic amplifier cores from their plus remanence to their minus remanence points. In particular, the reverse current flow is caused to pass through the signal winding rather than through the power winding and this is effected by connecting the upper ends of the signal winding, for instance of the amplifier I, to a source of negative potential —V, via a resistor R16. In practice, when a power pulse applied to the power winding is negative going in nature a current will pass from the source of positive potential +E, coupled to the lower end of the signal winding through the said signal winding and thence through the resistor R16 to the source of negative potential —V. This current flow is in a proper direction to flip the core from its plus remanence to its minus remanence point during the application of a negative going power pulse to the power winding of the amplifier and therefore the device acts in accordance with the principles discussed previously. As before, the application of an input pulse to the signal winding will prevent the core from "flipping" from its positive remanence point to its negative remanence point, thereby permitting the amplifier to produce an output during the next succeeding positive going power pulse. The several modified sneak suppressors discussed previously are employed in each of the amplifiers shown in Figure 11 and the modified reverse current path is similarly employed in both of the non-complementing magnetic amplifier having cores I and III.

As has been discussed previously, to add binary numbers of $n$ bits, $n$ stages such as have been shown in Figures 9 or 11 will be required, one stage being provided for each significant place in the binary number. Returning for the moment to the showing of Figures 9 and 10, it should be noted that inasmuch as carries are generated at the output of the complementing amplifier 90 one pulse period or two pulse widths after the input bits are received, the maximum addition rate is determined by the number of bits in the binary number. Thus, for instance, a four binary digit adder in accordance with the present invention can accept one four binary digit number every five pulse periods, or once every ten pulse widths.

While I have described preferred embodiments of my invention, many variations will readily suggest themselves to those skilled in the art; in particular, the precise complementing and non-complementing magnetic amplifiers shown are merely illustrative and these amplifiers may in fact take a number of different forms which are all within the scope of the present invention. In this respect, for instance, reference is made to the copending application of Theodore H. Bonn and Robert D. Torrey, Serial No. 402,858, filed January 8, 1954, for "Signal Translating Device"; and to the copending application of John Presper Eckert, Jr., and Theodore H. Bonn, Serial No. 382,180, filed September 24, 1953, for "Signal Translating Device." Again, the adder stages of the present invention each comprise a binary counter as one portion thereof and while two such binary counter configurations have been illustrated, any appropriate counter configuration may in fact be employed in accordance with the present invention. In this respect once more, reference is made to my copending application Serial No. 424,880, filed April 22, 1954, for "Bistable Devices Utilizing Magnetic Amplifiers," now U. S. Patent No. 2,709,798, issued May 31, 1955; as well as to the copending application of John Presper Eckert, Jr., Serial No. 448,206, filed August 6, 1954, for "Magnetic Counter Circuits," now U. S. Patent No. 2,802,703; each of which applications teach other forms of counter circuits utilizing magnetic amplifiers such as may be employed in the present invention. The several copending applications given above have been assigned to the assignee of the instant application, and the teachings thereof may be readily employed in the practice of the present invention.

Similarly, the quarter adder shown in Figure 8 is, as has been mentioned previously, illustrative only and other devices accomplishing the same function will be suggested to those skilled in the art. All such variations as are in accord with the principles discussed previously, are meant to fall within the scope of the present invention as set forth in the appended claims.

Having thus described my invention, I claim:

1. A parallel adder comprising a plurality of interconnected adder stages, one for each bit of a parallel binary digital input, each of said stages including a binary counter comprising first and second magnetic amplifiers energized respectfully by power pulses of different phases, means coupling the output of said first amplifier to the input of said second amplifier, means coupling the output of said second amplifier to the input of said first amplifier, a source of digital signal inputs coupled to the input of one of said amplifiers, and carry means responsive to both the output of one of said amplifiers and to said source of digital signals for coupling a carry signal to an input of the binary counter in the next succeeding adder stage.

2. A parallel adder comprising a plurality of interconnected adder stages, each of said stages including a binary counter comprising a pair of magnetic amplifiers energized respectively by power pulses of different phases, means coupling the output of a first one of said amplifiers to the input of the other of said amplifiers, a source of digital signal inputs coupled to said binary counter, means coupling carry signals from a preceding stage to said binary counter, first means responsive to said digital signal inputs and to said carry signals for coupling the output of the other of said amplifiers to the input of the first of said amplifiers, and second means responsive to both the output state of said binary counter and to said digital and carry signal inputs for feeding a further carry signal from each of said adder stages to the binary counter of the next succeeding adder stage.

3. The parallel adder of claim 2 in which each of said magnetic amplifiers comprises a non-complementing magnetic amplifier.

4. The parallel adder of claim 3 in which each of said magnetic amplifiers includes a core of magnetic material exhibiting a substantially rectangular hysteresis loop.

5. The parallel adder of claim 2 in which each of said magnetic amplifiers comprises a complementing magnetic amplifier.

6. The parallel adder of claim 2 in which said first means comprises a quarter adder.

7. The parallel adder of claim 6 in which said quarter adder has two input terminals and an output terminal, said output terminal being coupled to the input of the said first of said amplifiers, the output of the other of said amplifiers being coupled to one of said input terminals, said source of digital signal inputs being coupled to the other of said input terminals.

8. The parallel adder of claim 7 in which said quarter adder comprises a pulse transformer having a primary and secondary winding thereon, said two input terminals being coupled respectively to opposite ends of said primary winding, and said output terminal being coupled to one end of said secondary winding.

9. The parallel adder of claim 2 in which said second means comprises a permissive gate having two input terminals, means coupling the output of one of said magnetic amplifiers to one of said gate input terminals, and means coupling said source of digital signal inputs and said carry signal inputs to the other of said gate input terminals.

10. The parallel adder of claim 9 in which each of said magnetic amplifiers comprises a non-complementing pulses type amplifier.

11. The paralle ladder of claim 10 in which said second means includes a complementing pulse type magnetic amplifier, and means coupling the output of said gate means to the input of said complementing amplifier.

12. A parallel adder stage comprising a binary counter including first and second magnetic amplifiers energized respectively by power pulses of different phases, means coupling the output of said first amplifier to the input of said second amplifier, a quarter adder having two input terminals and an output terminal, means coupling the output of said second amplifier to one of said input terminals, a source of carry signals and a source of digital signal inputs each coupled to the other of said input terminals, means coupling the output terminal of said quarter adder to the input of said first amplifier, and gate means responsive to the output of said second amplifier and to said source of digital signal inputs for producing a further carry signal.

13. The parallel adder stage of claim 12 in which said gate means includes an output terminal, and means including a pair of series connected magnetic amplifiers for coupling said further carry signal appearing at said output terminal to a further parallel adder stage.

14. A parallel adder stage comprising a binary counter including first and second non-complementing magnetic amplifiers energized respectively by power pulses of different phases, first gate means for coupling the output of said first amplifier to the input of said second amplifier, means coupling the output of said second amplifier to the input of said first amplifier, a source of digital signal inputs and a source of carry signal inputs each coupled to the input of said first amplifier, a first complementing magnetic amplifier having its output coupled to said first gate means for controlling said first gate means, second gate means responsive to said digital and carry signals and to the output of said second non-complementing amplifier for coupling an input to said first complementing magnetic amplifier, and a second complementing amplifier having its input coupled to the output of said first complementing amplifier for producing a further carry signal.

15. The combination of claim 14 in which each of said amplifiers includes a core of magnetic material exhibiting a substantially rectangular hysteresis loop.

16. A parallel adder comprising a plurality of interconnected adder stages, one for each bit of a parallel binary digital input, each of said adder stages including a binary counter comprising a pluse type magnetic amplifier and delay means coupling the output of said magnetic amplifier to the input thereof, power pulse means for regularly energizing said magnetic amplifier, a source of digital signal inputs coupled to the input of said binary counter, and carry means responsive to both the output of said binary counter and to said source of digital signals for coupling a carry signal to the input of the binary counter in a next succeeding adder stage.

References Cited in the file of this patent

UNITED STATES PATENTS

| | | |
|---|---|---|
| 2,503,765 | Rajchman et al. | Apr. 11, 1950 |
| 2,696,347 | Lo | Dec. 7, 1954 |
| 2,717,311 | Ogletree | Sept. 6, 1955 |

UNITED STATES PATENT OFFICE

CERTIFICATE OF CORRECTION

July 15, 1958

Patent No. 2,843,317

William F. Steagall

It is hereby certified that error appears in the printed specification of the above numbered patent requiring correction and that the said Letters Patent should read as corrected below.

Column 4, line 37, for "pulse" read --plus--; column 7, line 62, for "added" read --adder--; column 14, line 61, strike out "now U. S. Patent No. 2,802,703;".

Signed and sealed this 14th day of October 1958.

(SEAL)
Attest:

KARL H. AXLINE
Attesting Officer

ROBERT C. WATSON
Commissioner of Patents